April 16, 1968   T. N. GARLAND   3,377,946
SCRAP METAL PRESS

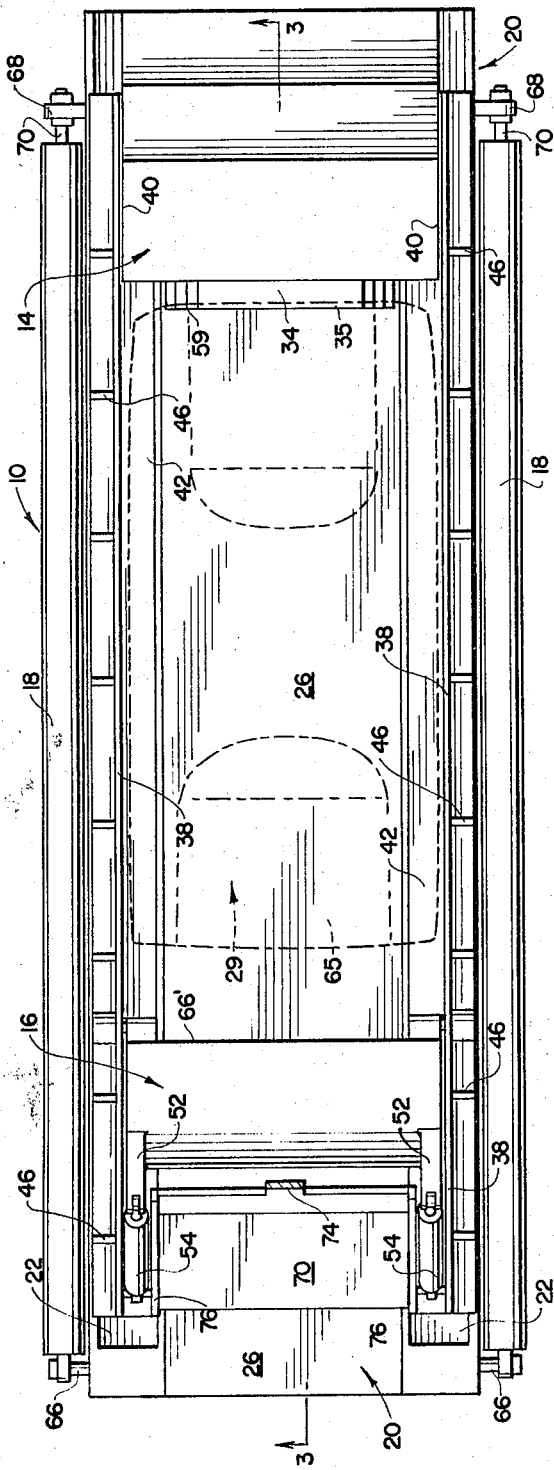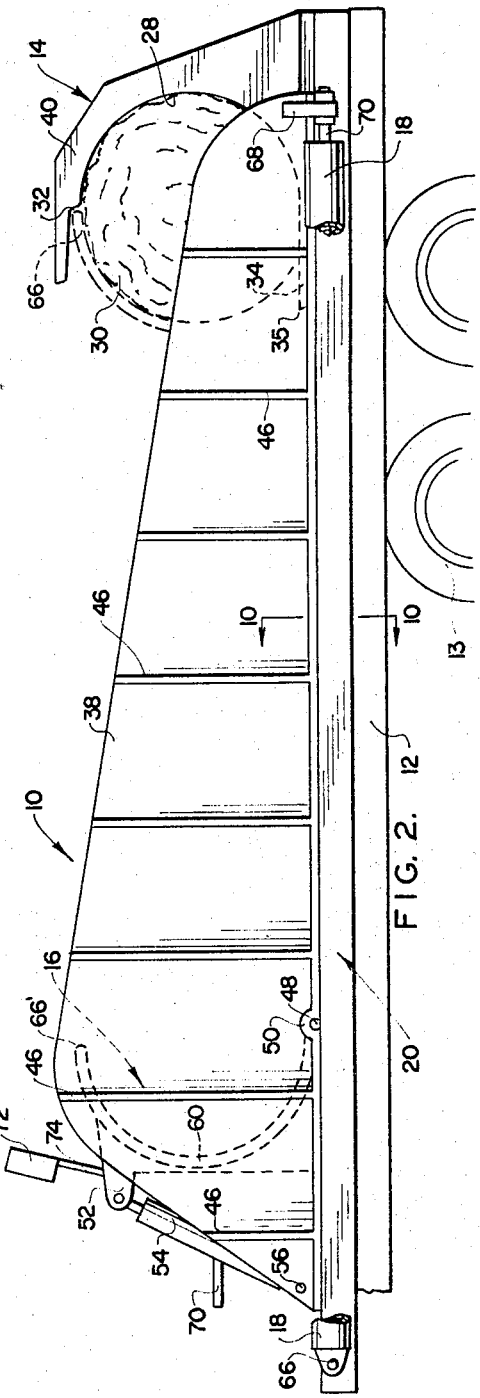

Filed March 7, 1966   3 Sheets-Sheet 2

INVENTOR.
THOMAS N. GARLAND
BY
Anderson, Spangler & Wymore

April 16, 1968     T. N. GARLAND     3,377,946
SCRAP METAL PRESS

Filed March 7, 1966                                3 Sheets-Sheet 3

INVENTOR.
THOMAS N. GARLAND
BY
Anderson, Spangler & Wymore

United States Patent Office 3,377,946
Patented Apr. 16, 1968

3,377,946
SCRAP METAL PRESS
Thomas N. Garland, Denver, Colo., assignor of five percent to Marion Higgenbothom, Manitou Springs, Colo., ten percent to E. A. Christensen, Lubbock, Tex., one percent to Robert E. Wallace, Newport News, Va., one percent to Whitney B. Siebert, Hartford, Conn., and an undivided twenty percent to Edward L. Spangler and Max L. Wymore, Denver, Colo., and Edward L. Brown, Jr., Wichita, Kans.
Filed Mar. 7, 1966, Ser. No. 532,314
8 Claims. (Cl. 100—98)

ABSTRACT OF THE DISCLOSURE

The present invention involves an automobile press which separates the frame from the body and at the same time compresses the body into a dense mass. It comprises a base member with guides positioned along the side thereof. A compressing member is mounted at one end of the base while another compressing member is slidably mounted in the guides. One of the compressing members has an opening therein tor eceive and pass an automobile frame as the body is compacted. A power means is incorporated into the invention to force said compressing members together such that the automobile body is compressed therebetween.

The present invention in general relates to an improved apparatus for processing scrap metal and more specifically to a portable press for separating and baling scrap automobile bodies.

The disposing of junked automobiles is fast becoming a national problem of major importance as evidenced by recent Federal legislation and concern by the President. Located throughout the country are a vast number of unsightly automobile graveyards which are mushrooming at an ever increasing rate.

Between the enormous supply of junk autos, and the shrinking use of it by the steel industry, the price of scrap has tumbled so that only half of the 5.5 million cars that are junked each year are now melted down to make new steel. Indicative of the present value of old cars was the fact that in Chicago alone last year over 20,000 cars were abandoned on the streets. Because of the shrinking price of scrap steel and changing needs of the steel industry to a higher grade of scrap, new methods and apparatus must be developed to economically process our country's greatest source of scrap steel.

The automobile salvage business includes two distinct fields, only the second of which we are concerned with in the present invention. There are the "wreckers" who strip cars of their usable parts for replacement value. With the increased incidence of teen-agers driving second-hand cars, a healthy market has been created for spare parts from scrapped cars. There is also an active market for the engines and transmissions as replacements and power means for other machines, both at home and abroad. Once the usable parts have been stripped from the automobile, the hulk of the body is processed by a second phase called a scrap "processor." This second stage is the specific field of salvage to which the present invention is directed.

While the heavier parts such as the engine and drive train are considered high grade scrap, the skeleton of the body contains numerous non-ferrous impurities which are undesirable to the steel mills. The upholstery, paint, trim, copper wiring and various other alloys must be removed before the steel in theb ody is usable in the steel furnaces. One of the common methods of removal was to incinerate the impurities and press the remaining bulk into a high density bale. Because of the substantial air pollution caused by the incineration, scrap processors are readily being forced by the local municipalities to stop such operations. To hand strip a hulk in place of incineration raises the cost, rendering the process totally unfeasible.

The more modrn methods to separate contaminants have been various types of shredding processes such as the "Proler Process," Patent No. 2,943,930, and Gates Patent No. 3,103,163. These processes reduce the car bodies into small shredded or sheared pieces which are magnetically separated. The ferrous pieces are then milled, trammeled and roasted in a rotary furnace to further remove or burn off the contaminants. The product resulting from the above-described process is a very high quality scrap suitable for most types of current steel furnaces.

Another reason for the declining scrap market is the steel industry's trend toward the usage of oxygen furnaces. Because of the rapid heat time of an oxygen furnace, 50 minutes compared with 18 hours of the old open hearth, much higher grade charges must be used. The proportion of scrap to ore has dropped to 25% in the oxygen process and any contaminants can have very undesirable results.

Regardless which process is used to separate the contaminants, the car bodies must be compressed so that their transportation is economically feasible. Another reason for compressing the car bodies is that it reduces the exposed surface of the metal, thereby reducing the amount of oxidation during storage. Various types of baling presses have been developed such as those shown in patents to Patros, et al. 2,986,992, and Purcell, 3,036,516.

If the heavy gauge frame is removed from the hulk before compressing, a press of much smaller weight and size than the above mentioned presses can be used. This becomes readily apparent when considering the necessary forces and energies required to press or shred such heavy gauge steel as a car frame. Another reason is the fact that the frame alone need not be further processed since it contains no contaminants and because of its heavy gauge is of sufficient density for shipping. In the present systems, which remove the frame from the body before compressing, the separation is done by hand. This very time-consuming operation involves the usage of a cutting torch at the various points where the body is attached to the frame. It entails a considerable amount of time compared with the few minutes involved in processing the remaining body. With the declining prices of scrap, the price of the above hand operation is becoming prohibitive.

The automobile press of the present invention not only compresses the body, but shears the frame from the body in the same operation. This method eliminates the cumbersome above-mentioned hand-cutting operation. As the instant press begins to compress the car body, an adjustable opening in the bottom edge of the compressing surface allows the frame to pass therethrough without being compressed. The compressing surfaces at both ends of the press are arcuate shaped so that when the car body is fully compressed, the remaining bale will by cylindrical shaped. As the car frame extends through the above-mentioned opening, the sharp edges surrounding the opening shear the various bolts and welds which fasten the body to the frame. Once the frames are separated from the bodies, they are considered high grade scrap without need of further processing. The cylindrical bale produced from the auto body has a relatively low density of 25 pounds per cubic foot as compared with 100 to 125 pounds per cubic foot produced by one of the above-mentioned baling presses. The density is sufficient for economic transportation. The cylindrical bale then passes through a milling or shredding process to remove the contaminants. The bale is cylindrical shaped so that it may be shredded by a longitudinal cutting bar on a lathe-type machine. The shredded material is then treated in a similar manner as in the above-mentioned shredding processes.

The present auto baling presses and shredding processes are very complex and expensive; for example, the Proler process mentioned above involves millions of dollars. Operations of this nature can only be economically feasible in highly populated areas where there is a large source of junk cars. The city of Chicago has 36 tow trucks working full time just to remove the abandoned cars from its streets. Smaller cities in the West and South cannot support one of these large operations and, therefore, the present invention has attempted to fill this gap. The press of the present invention is much smaller in size. It is readily portable and can be carried by a semi-trailer from junkyard to junkyard.

It is, therefore, the principal object of the present invention to provide a new and efficient apparatus for handling scrap metal automobile bodies.

A second object of the present invention is to provide a novel and improved portable automobile baling press.

Another objective of the invention is to provide a baling press which automatically separates the automobile frame from the body while at the same time compacts the body.

Another object of the invention is to provide a baling press which forms a cylindrical bale adapted for shredding on a lathe-type machine.

Still another object of the present invention is to provide a portable scrap processing unit which may be easily transported from junkyard to junkyard for reducing automobile bodies to compact masses which can be economically transported to further processing plants.

Other objects and advantages of the present invention will become apparent to those skilled in the art from the following description when read in conjunction with the accompanying drawings wherein:

FIGURE 1 is an overall plan view of the salvage unit of the present invention;

FIGURE 2 is a side elevational view of the baling press positioned on a common flat bed semitrailer;

Figure 3:
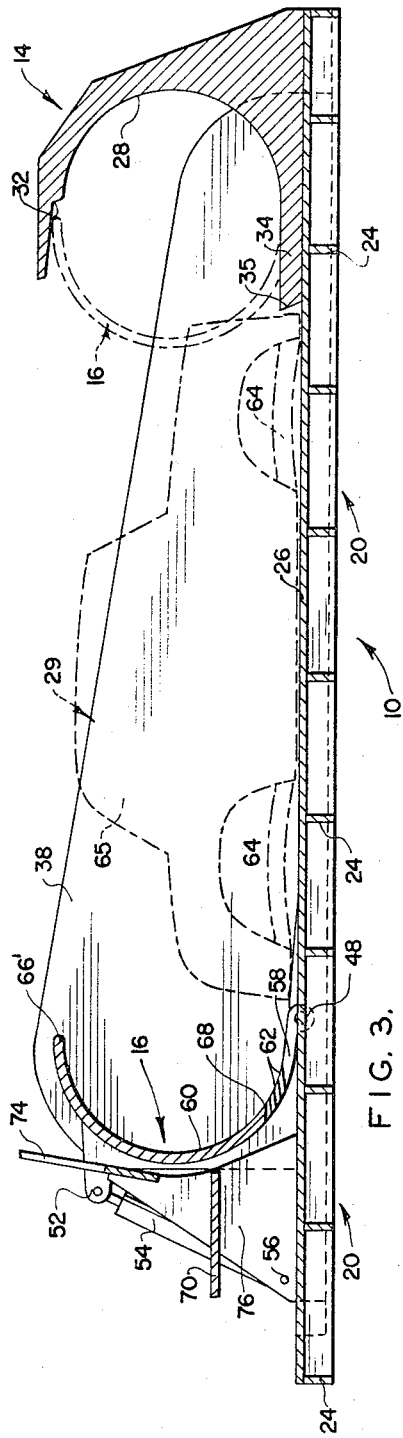
FIGURE 3 is a longitudinal vertical section taken along line 3—3 of FIGURE 1.

Referring now to the drawings for a detailed description of the present invention, and initially to FIGURES 1 through 4, for this purpose it will be seen that the baling press has been designated in its entirety by reference numeral 10. The press 10 can be portably carried on a truck-trailer 12 having tires 13 as shown in FIGURE 2. By the usage of a crane, not shown in the drawings, the baling press 10 can be easily moved on or off the trailer 12 at various sites of operation.

Figure 5:
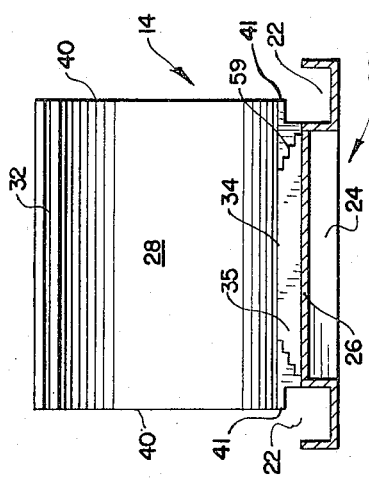
FIGURE 5 is a lateral sectional view taken along line 5—5 of FIGURE 4.

The press 10 essentially comprises two arcuate compressing members 14 and 16, one positioned at each end of the press, which are brought together by a pair of hydraulic cylinders 18 which will later be discussed in detail. The compressing member 14 remains stationary during the operation of the press and is mounted at one end of a base member 20. The base 20 which rests on the ground extends the full length of the press 10 when in the open position as seen in FIGURES 1 and 3. Longitudinally positioned along both sides of the base 20 are a pair of channels 22 which guide the movement of the opposing compressing member 16, as seen in FIGURE 5. The channels 22 are integrally formed with the base 20. They are held in spaced relation by a series of lateral ribs 24 longitudinally spaced thereof and a planar work-supporting surface or floor 26, all of which is of welded construction.

Figure 4:
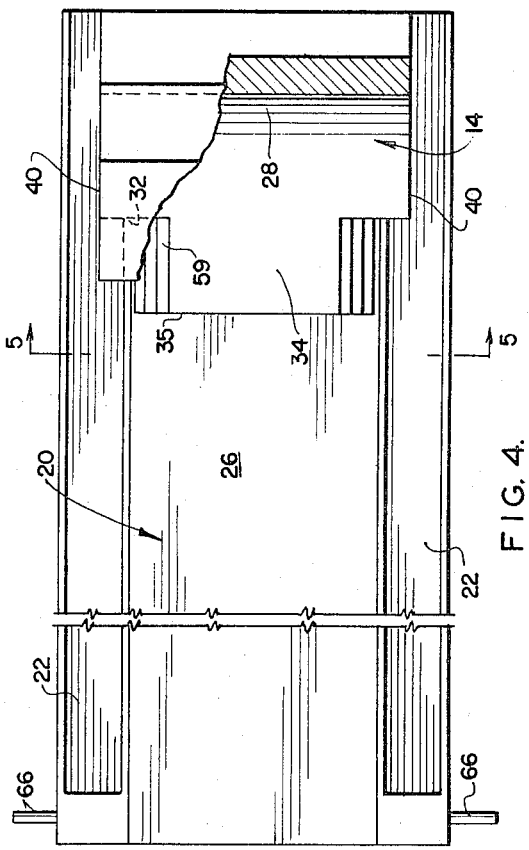
FIGURE 4 is a plan view of the base member of the press portions thereof broken away to show the stationary compressing surface.

The stationary compressing member 14 is integrally attached at one end of the base 20 as shown in FIGURE 3. The member 14 is constructed of reinforced welded steel plate, the detail of which is not shown. The member 14 has an arcuate semicircular surface 28 which the automobile body 29 is forced against. The corresponding compressing member 16 has a similar shape and when they are brought together, the car body 65 is compacted into a cylindrical shape bale 30 as seen in FIGURE 2. At the upper edge of surface 28 is a notched portion 32 which permits the corresponding edge 66' of the opposing compressing member 16 to fit in juxtaposed overlapping relation. Positioned immediately forward of member 14 and integral therewith is a platform 34 as seen in FIGURES 4 and 5. The top of the platform lies in tangential relation with the curved surface 28 of the stationary compressing member 14. The stepped sides 59 of the platform and the forward edge 35 will be further described.

The opposite compressing member 16 is slidably mounted on the base 20 and, upon activation, will move towards member 14 to its final position as shown in dotted line in FIGURES 2 and 3. The two compressing members 14 and 16 are confined within a pair of side walls 38 to make up the enclosure area or chamber of the press. The side walls 38 function to restrict any sideways movement of the automobile body as it is being compressed. The movable compressing member 16 and its related assembly are integrally mounted with the side walls 38 so that as the member 16 moves towards the stationary member 14, the side walls 38 will move in a similar direction and manner. At all times, the inner surface of the side walls 38 are in abutting relation with the side edges 40 of the member 14. As the press 10 is activated, the side walls 38 will slide past stationary member 14, maintaining it in continual confinement. The side walls 38 are sloped upward toward the member 16 at the rear of the press as seen in FIGURE 3; the reason for this being that only when the compressing members are approaching the final compaction of the car body are side walls of maximum height necessary. When the press 10 is in its open position, the lower portions of the side walls 38 better facilitate the initial insertion of the car body and removal of the finally compressed bale. If the walls 38 were stationary, it would be necessary that they extend above the height of at least the stationary compressing member 14. This would make removal of the compacted bale more difficult since the ends of the bale would be covered, preventing engagement by a pair of grappling hooks.

Figure 10:
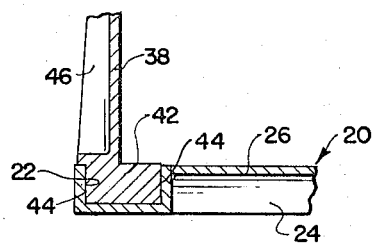
FIGURE 10 is a fragmentary section taken along line 10—10 of FIGURE 2.

At the lower edge of each of the side walls 38 is a rail 42 which guides the movement of the compressing member 16. The rails 42 have multiple bearing surfaces, which ride in channels 22 of the base member 20 as best seen in FIGURE 10. The vertical side edges 44 of the rail not only limit lateral movement of the walls, but also any outward tilting of the upper edges which might be caused as the press approaches maximum compaction. Located on the outer sides of the walls 38 are a series of vertical ribs 46 which reinforce against lateral forces cause by the compressing of the bale.

The compressing member 16, which as a similar arcuate compressing surface to its corresponding opposite member 14, is pivotally mounted at its lower edge to the side walls 38. Pins 48 are integrally attached to the lower edge of member 16 and passthrough a pair of bearings 50 which are located in the rails 42. Therefore, the two side walls 38 are connected by means of member 16 which pivots therebetween. Formed on the back side of member 16 are a pair of mounting lugs 52 which are pivotally connected to a pair of double acting hydraulic cylinders 54. The cylinders are in turn pivotally connected at their opposite ends to the side walls 38 by means of pivot pins 56. By action of the cylinders 54, the member 16 can be rotated about pins 48 and locked in any position desired.

Figure 6:
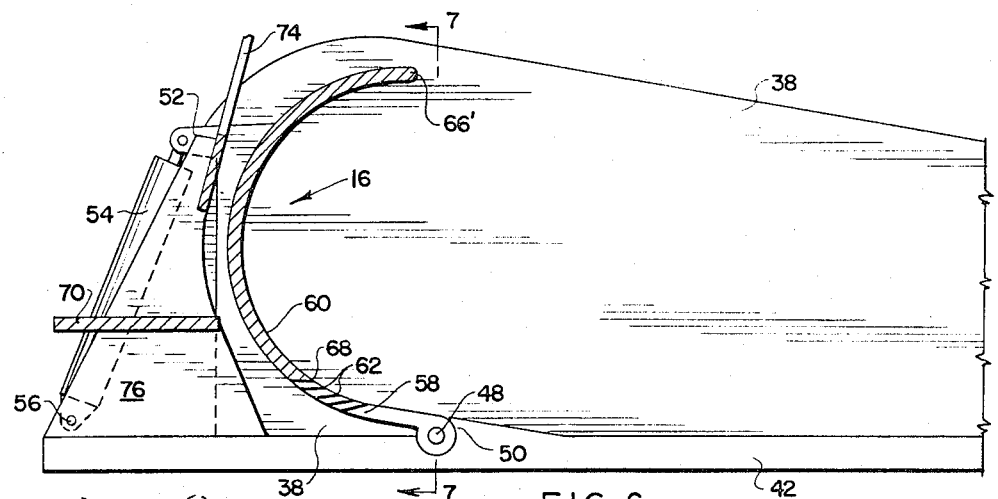
FIGURE 6 is a longitudinal fragmentary section showing the detail of the pivotal compressing member.
Figure 7:
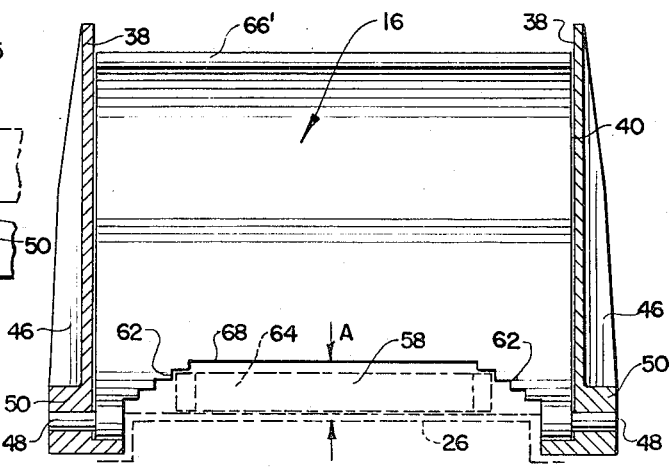
FIGURE 7 is a lateral sectional view taken along line 7—7 of FIGURE 6 illustrating the automobile frame in dotted line.
Figure 9:
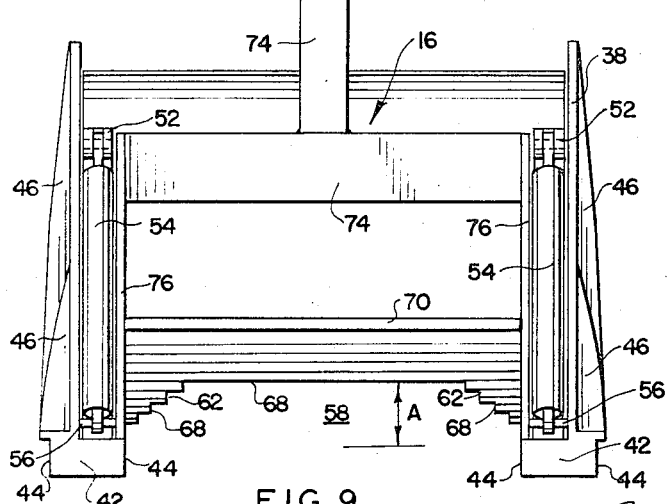
FIGURE 9 is an end view of the pivotal compression member.

At the lower edge of member 16 between the pivot pins 48 is an opening or cut out portion 58. The opening extends up into the curved compression surface of member 16. The sides of opening 58 have converging stepped edges 62, which will be further described, as best seen in FIGURES 7 and 9. In viewing the opening 58 from one end of the press, as the cylinder 54 is extended, the member 16 pivots in a clockwise direction causing the opening 58 to appear larger or greater in depth. The reason for this becomes apparent after considering the attitude of the lower edge of member 16 as seen in FIGURE 6. The purpose of the opening 58 is to allow the passage of the car frame 64 therethrough as will be further described in detail.

Positioned on both sides of the press 10 are a pair of double acting hydraulic cylinders 18 which run the full length of the press. The cylinders 18 supply the necessary forces to compress the car bodies and retract the press to its open position. The closed end of the cylinders 18 are attached to the base 20 by means of a shaft 66 which is mounted on the base 20. The rod ends of the cylinders 18 are connected to the side walls 38 at their forward end by means of a pair of lugs 68. As the shafts 70 of the cylinders 18 are extended, the side walls 38 and member 16 are moved toward the stationary member 14. The movement of the side walls is guided in channels 22 as they slide past the side edges 40 of member 14. Any upward movement of the walls 38 is limited by the overhanging edges 41 as seen in FIGURE 5. As the press 10 approaches its fully compressed position, the side walls 38 have slid substantially past the stationary member 14. To return the press to its open position, hydraulic pressure is merely switched to the rod ends of the cylinders 18 to retract the press 10 to its open position.

Before an automobile is ready for the baling process, heavy parts such as the wheels, engine, transmission and drive train are stripped from the hulk of the body. Such items are separately processed and have no bearing on the present invention. Contrary to the prior art presses, the frame and wheel assemblies can be left intact with the body during baling. The remaining hulk 29 is placed in the open press 10 as seen in FIGURE 3. The side walls 38 of the press are spaced apart a distance slightly greater than the width of a full size automobile. The frame 64 of the hulk rests substantially on the floor surface 26 of the base. Attention is directed to the platform 34 which protrudes upward from the surface 26.

As the press begins to compress the hulk, the frame 64 comes in contact with the edge 35 of the platform 34. The edge 35 is beveled inward to prevent the frame 64 from slipping over the platform during initial compressing of the hulk. As the press 10 begins to close, the curved compressing surface 60 will come in contact with the hulk 29. Upon initial contact, the hulk 29 might have a tendency to slide upward because of the curved surface 60. For this among other reasons, the compressing member 16 is pivotally mounted so that it may be tilted forward to prevent the hulk from sliding upward as above-mentioned.

The tilting movement of members 16 is accomplished by the hydraulic cylinders 54 pivotally attached thereto.

An automobile frame is constructed of heavy gauge steel which is relatively stiff compared to the sheet metal in the body. Therefore, when the automobile is compressed, the body will begin to crush before the frame. This basic principle is fundamental to the separating-type press of the instant invention.

Figure 8:
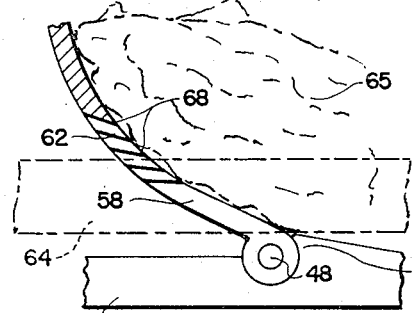
FIGURE 8 is a fragmentary section in an enlarged scale showing the cutting edges of the compressing member with a dotted line illustration of the car body separating from the frame.

When the car begins to compress, the light gauge metal body will collapse and tear away from the frame 64 while the frame remans rigid. Because of the opening 58 at the lower edge of member 16, no direct compression is applied against the frame 64. Therefore, as the body 65 collapses, the frame retains its shape and passes out the opening 58 as illustrated in FIGURE 8. Proper alignment of the frame 64 and the opening 58 during initial contact is critical to the operation, for if the frame comes in contact with member 16, the frame will collapse along with the car body. This critical alignment is regulated by varying the vertical depth (a) of the opening 58. It is accomplished by pivoting member 16 clockwise as seen in FIGURE 6 to increase the opening and counter-clockwise to decrease same. Normally, the operator of the press 10 will extend the cylinders 54 a substantial amount before initial contact is made with the car. This provides an opening 58 of maximum vertical depth to prevent any possibility of the frame 64 contacting member 16. Another reason for tilting member 16 forward during initial contact is to prevent the possibility of the car 29 from creeping upward by reason of the curved bearing surface 60 of member 16. Tilting member 16 forward not only decreases the attitude of surface 60 with respect to the auto body, but brings the uppermost edge 66' of member 16 into contact with the top of the car body.

After the initial contact and the end of frame 64 has passed through the opening 58, the operator will tilt member 16 backward, thus decreasing the depth of opening 58.

The car body 65 and frame 64 are integrally attached by a variety of bolts and welds which must be sheared for separation. This action is achieved by the edges 68 which surround the opening 58. Said edges are formed of hardened cutting steel with tapered knife edges as shown in FIGURE 8. The operator will bring the cutting edges 68 down as close to the frame 64 as possible so as to make a clean shear from the frame. Various automobiles have frames of different shape and size. To provide for this variation, the sides of the opening 58 are formed with converging stepped edges 62 as previously mentioned. For example, in viewing FIGURE 7, the cutting edges are brought down until a pair of stepped edges 62 surround the sides of the frame. If the frame 64 had a greater width, a wider spaced pair of steps 62 would be used. The curved compressing surface 60 is not only advantageous in forming a cylindrical bale, but because of its upward slope at the cutting edge 68, it provides an added prying action between the body and frame to better facilitate separation.

The operator who regulates the angular position of member 16 stands on a platform 70 immediately behind member 16. During the initial movement of the press, he watches the opening 58 from the back side of member 16 for any possible frame alignment problems which might arise. The press 10 is operated from a control panel 72 mounted on a T-shaped support member 74. The support member 74 is in turn attached to a pair of side panels 76 extending upward from the rails 42. The side panels 76, platform 70 and support member 74 together form a secondary connection between the side walls 38.

Platform 34, which is located at the lower inward edge of the stationary compressing member 14, performs a dual function. The beveled forward edge 35 provides a back stop for the car frame 64 as the frame and body 65 are being separated. In the absence of platform 34 upon initial compaction, the car would ride up into the arcuate compressing surface 28 causing the sheet metal body to crush at both ends. This would be undesirable since it is of paramount importance that the car frame 64 remain in close parallel relation with the floor surface 26 of the base during the separation.

When the press 10 is in the fully closed or compressed position, member 16 is in the position shown in dotted line in FIGURE 3. Attention is called to the fact that in this position, platform 34 has substantially passed through opening 58. The frame 64 has, therefore, completely been separated from the now compressed car body. In viewing the end of the platform 34, it is noted that it has a similar congruity to the opening 58 in member 16. The stepped sides 59 are the same as opening 58. When the end of platform 34 passes through the opening 58, it functions substantially as a punch press, providing a clean separation between the frame 64 and the body 65. In the absence of such a separation, it would be necessary to use a cutting torch to sever any stray connecting pieces.

A single operator stationed upon platform 70 can operate the baling press 10 with the assistance of a crane to place the cars 29 in the press and pick up and stack the bales and frames. The time required for separating the frame from the body and reducing the body to a densely compacted bale is a matter of minutes. The interval involved is a fraction of the time consumed in a hand cutting operation.

To briefly describe the sequence of the operation, it can be generally categoried into the phases of separation and final baling. The automobile hulk is first placed by a crane in the open press 10 as seen in FIGURE 3. The operator begins to close the press while at the same time he tilts the compressing member 16 forward to hold the hulk 29 against the bottom of the press 26. This tilting action also provides a sufficiently large opening 58 so that the end of the frame will pass through said opening without contacting member 16. Once the frame has entered the opening 58, the operator will tilt the member 16 backward decreasing the opening to a size comparable to the maximum cross sections of the frame. With the compressing member 16 in this position, the sharp edges 68 of the opening begin to shear the body from the frame while the curved surface 60 separates and crushes the sheet metal body 65. During the separation phase of the operation, the opposite end of the automobile is held at the frame only by the forward edge of platform 34. When the body 65 has been completely separated from the frame, it will be forced against the arcuate surface 28 of the stationary compressing member 14. This second phase completes the compacting by pressing the body 65 into a cylindrical bale 30. As the press opens, a crane removes the bale 30 and inserts another automobile hulk and the process is repeated. The frames 64 as they are separated from the bodies, are separately stacked for shipment to the mills without further process.

Although the invention has been described in which the compressing members 14 and 16 preferably have arcuate surfaces, it is stressed that the said compressing members may also have various other configurations. The surfaces, for example, can be angular shaped and still carry out the above-described mechanical principles in an equally efficient manner.

Having thus described the several useful and novel features incorporated in the automobile baling press of the present invention, it will be seen that the many worthwhile objectives for which it was designed have been achieved. Although but a single specific embodiment of the carrier has been illustrated and described herein, we realize that certain changes may well occur to those skilled in the art within the broad teaching hereof; hence, it is our intention that the scope of protection afforded hereby shall be limited only insofar as said limitations are expressly set forth in the appended claims.

What is claimed is:

1. A baling press for scrap automobiles and the like adapted to forcibly separate the frame from the body while at the same time compressing the body which comprises a longitudinal base member, guide means positional at the respective sides of said base member, a first compressing member laterally disposed and mounted at one end of said base member, a second compressing member slidably mounted in said guide means, one of said compressing members having an opening therein of a size sufficient to receive and pass an automobile frame as the body is being compacted, said opening being positioned in the lower portions of said one compressing member, said opening in said one compressing member having an opening area not more than twenty percent of the total working area of said one compressing member, and a first power means operatively connecting said compressing members adapted to bring said compressing members together to compress the automobile body positioned therebetween.

2. A baling press for scrap automobiles as set forth in claim 1 in which said compressing members are laterally positioned in an upright manner on said base in parallel spaced relation and their movement relative to each other is longitudinal on said base.

3. A baling press for scrap automobiles as set forth in claim 1 which further includes: a pair of side walls positioned along the sides of said base, said compressing members positioned between the side walls together with the side walls defining a four walled variable length compressing chamber between which the automobile bodies to be crushed are placed, at the lower edge of said second compressing member is said opening running substantially the width thereof.

4. A baling press for scrap automobiles as set forth in claim 1 in which each of said compressing members have substantially planar bearing surfaces with vertical side edges and are laterally positioned on said base in an upright manner, a pair of vertical side walls positioned along the sides of said base for sliding movement in said guide means, the second compressing member being laterally disposed between said side walls interconnecting the side walls at one end thereof, the side walls and compressing members defining a variable length four walled chamber, the side edges of the first compressing member lie in juxtaposed sliding relation with the inner surfaces of the side walls as the press is moved to the closed position, at the lower edge of said second compressing member is said opening running substantially the width thereof.

5. A baling press for scrap automobiles as set forth in claim 1 which further includes: a pair of vertical side walls positioned along the sides of said base in parallel spaced relation slidably mounted in said guide means for longitudinal movement on said base, said compressing members are laterally positional between the side walls and together with the side walls define a four walled variable length compressing chamber between which the automobile to be crushed is placed, a horizontal planar portion of the base forming the floor thereof, the second compressing member being pivotally mounted to said side walls at one end thereof about a laterally disposed horizontal axis to permit the second compressing member to rotate the relative position of its bearing surface during the operation of said press, a second power means operatively connecting the side walls to the second compressing member adapted to rotate and lock said second compressing member at its various angular positions, the second compressing member having said opening running along the lower edge thereof approximate the floor of the press, the opening is positioned in substantial alignment with the frame of the automobile being compressed, the pivoting of said second compressing member varies the horizontal projection of said opening to provide for various shaped automobile frames.

6. A baling press for scrap automobiles as set forth in claim 1 which further includes: a pair of side walls vertically positioned along the sides of said base slidably mounted in said guide means for longitudinal movement in parallel spaced apart relation, the compressing members being laterally spaced between the side walls for relative movement towards each other defining a four walled variable length compressing chamber between which the automobiles to be crushed are placed, a horizontal planar portion of the base forms the floor of said chamber, the first compressing member being attached with one end of said base while the second compressing member is pivotally mounted to the side walls at its lower edge, a second power means operatively connected to said second compressing member adapted to rotate and lock the second compressing member in its various angular positions, the second compressing member having said opening running along its lower edge between its pivotal connection with the side walls, an abutment means having a frame engaging surface extending inward from the first compressing member into the compressing chmaber adapted to engage only the frame of the automobile being compressed, the abutment means being positioned in axial alignment with said opening on the second compressing member so that it will force the frame therethrough as the compressing members are brought together.

7. A baling press for scrap automobiles as set forth in claim 6 in which the compressing members have arcuate shaped bearing surfaces with vertical side edges which lie in juxtaposed relation with the inner surface of the side walls, the bearing surfaces are substantially semicircular so as to form a cylindrical bale of the automobile body when completely compressed, cutting means located on said second compressing members and positioned around the periphery of said opening adapted to shear the sheet metal body from the frame as the frame is forced through the opening.

8. A baling press for scrap automobiles as set forth in claim 1 which further includes: a pair of vertical side walls positioned along the sides of said base slidably mounted in said guide means for longitudinal movement, the compressing members being laterally spaced between the side walls for relative movement toward each other defining a four wall variable length compressing chamber between which the automobiles to be crushed are placed, a horizontal planar portion of the base forming the floor of said variable length chamber, the first compressing member mounted on the base has an arcuate bearing surface with vertical side edges lying in sliding juxtaposed relation with the side walls, abutment means extending inward from the first compressing member, the two side walls are connected by means of the second compressing member whose vertical edges are connected to the side walls at one end thereof, the second compressing member having a similar arcuate bearing surface to the first compressing member which when brought together form a closed cylindrical chamber with the side walls forming the ends thereof, the second compressing member having said opening therein positioned in axial alignment with said abutment means and of a size sufficient to receive said abutment means when the press is in the closed position.

References Cited

UNITED STATES PATENTS

| | | | |
|---|---|---|---|
| 2,932,244 | 4/1960 | Moyer | 100—39 |
| 3,039,343 | 6/1962 | Richards | 100—98 X |
| 3,049,274 | 8/1962 | Mosley | 100—98 X |
| 3,101,045 | 8/1963 | Van Endert | 100—233 |
| 3,170,389 | 2/1965 | Parks | 100—192 |

FOREIGN PATENTS 845,438  11/1952  Germany.

BILLY J. WILHITE, *Primary Examiner.*